July 21, 1931. G. B. KING 1,815,777
GRAMOPHONE
Filed April 8, 1929 13 Sheets-Sheet 1

INVENTOR
*George B. King*
BY *Munn & Co.*
ATTORNEYS

July 21, 1931.　G. B. KING　1,815,777
GRAMOPHONE
Filed April 8, 1929　　13 Sheets-Sheet 2

INVENTOR
George B. King
BY
ATTORNEYS

July 21, 1931.  G. B. KING  1,815,777
GRAMOPHONE
Filed April 8, 1929  13 Sheets-Sheet 3

INVENTOR
George B. King
BY
ATTORNEYS

July 21, 1931.    G. B. KING    1,815,777
GRAMOPHONE
Filed April 8, 1929    13 Sheets-Sheet 4
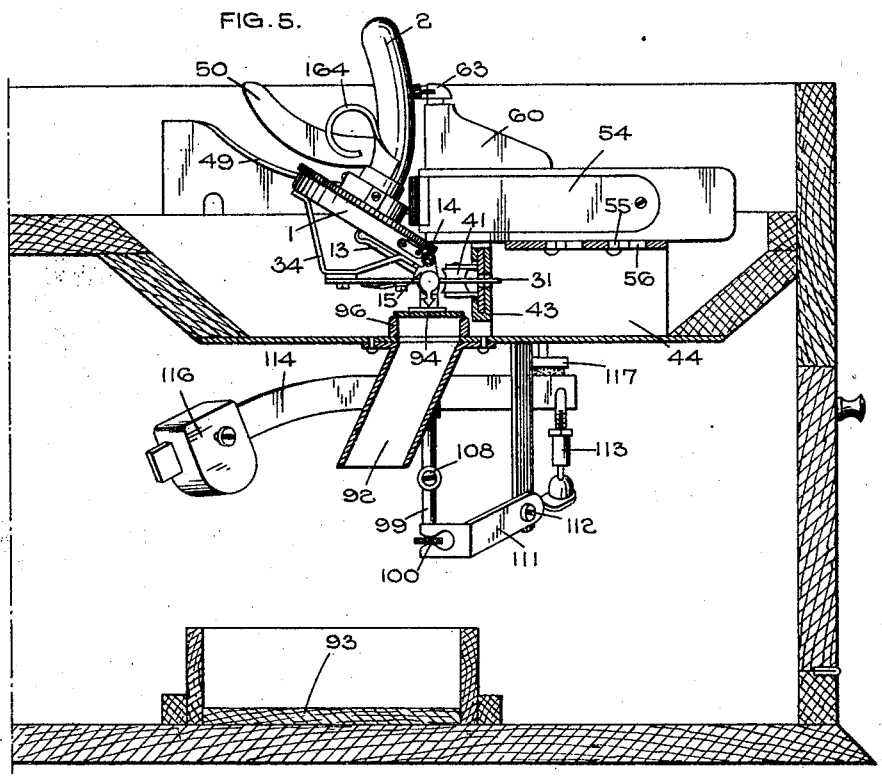
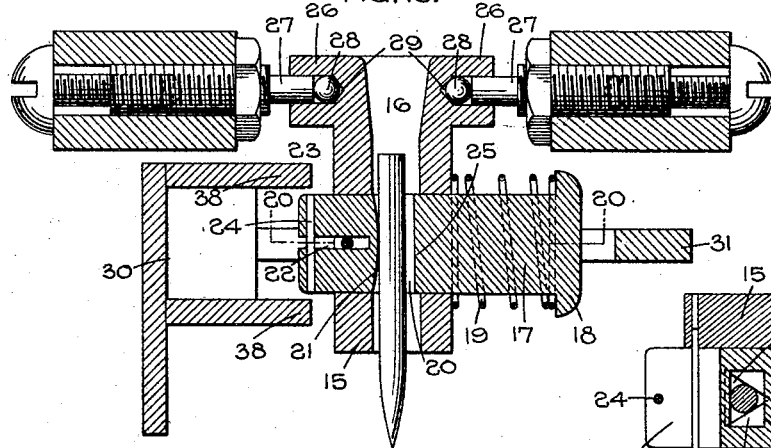
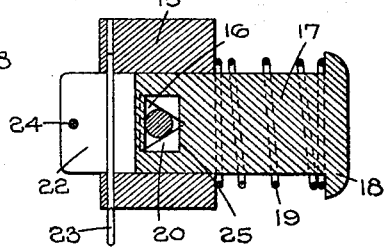
INVENTOR
*George B. King*
BY
*Munn & Co.*
ATTORNEYS July 21, 1931.  G. B. KING  1,815,777
GRAMOPHONE
Filed April 8, 1929   13 Sheets-Sheet 5
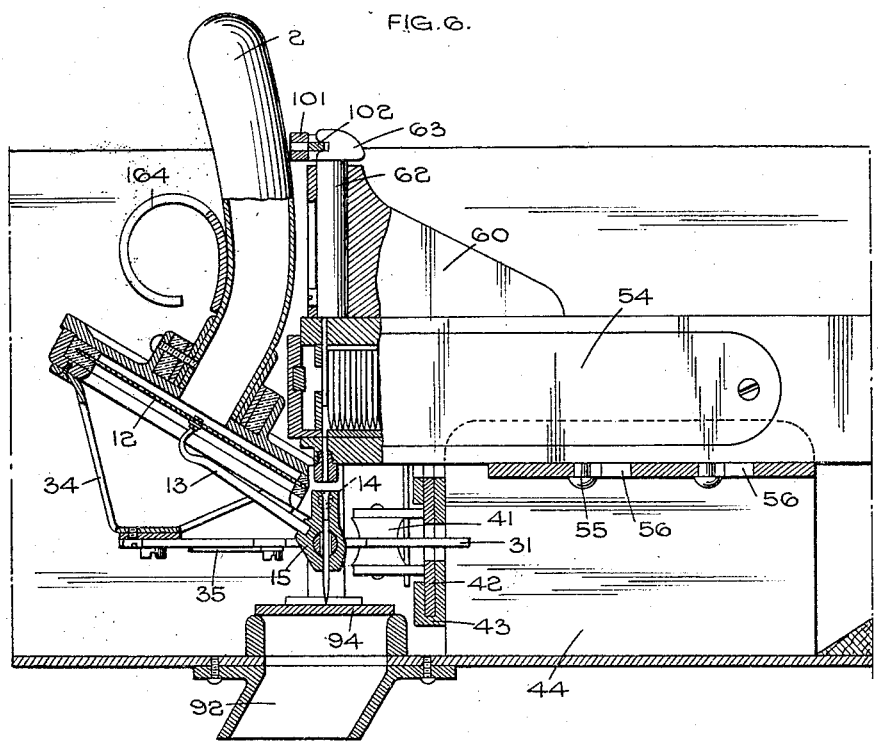
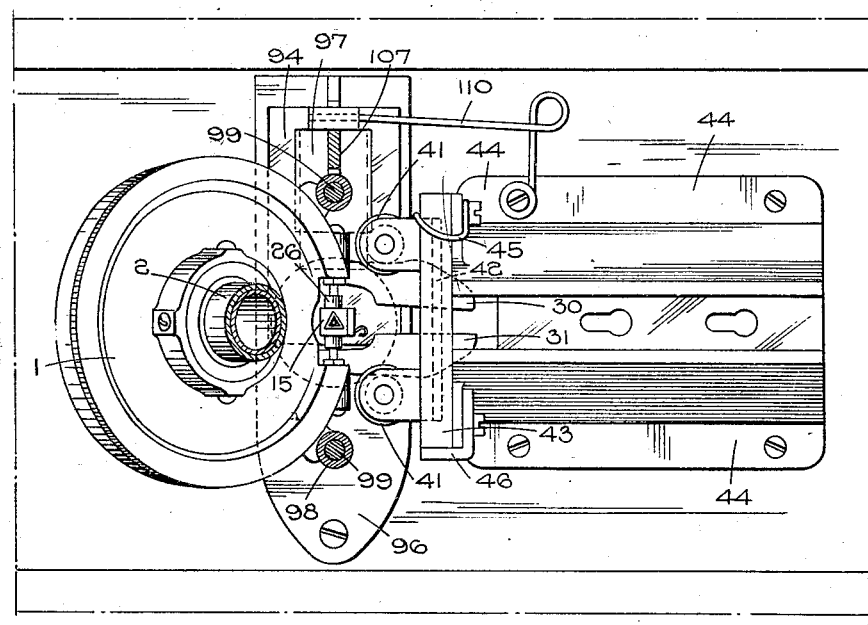
INVENTOR
George B. King July 21, 1931.  G. B. KING  1,815,777
GRAMOPHONE
Filed April 8, 1929  13 Sheets-Sheet 6

INVENTOR
George B. King
BY
ATTORNEYS

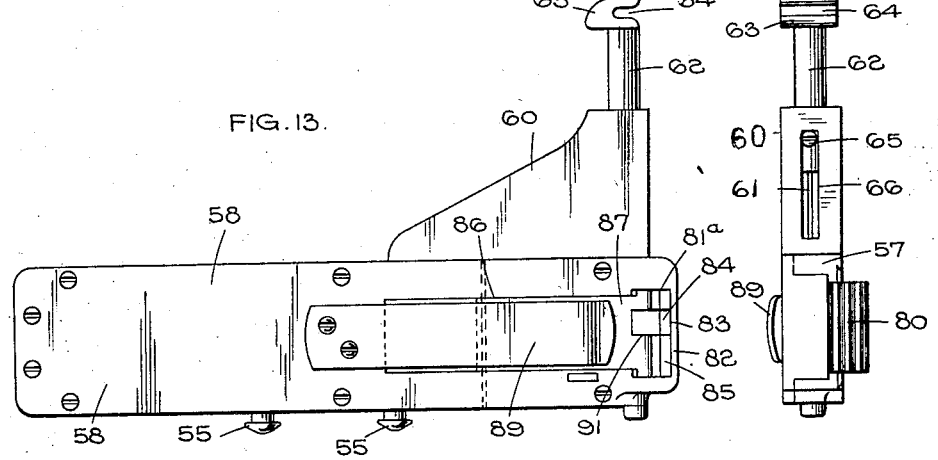
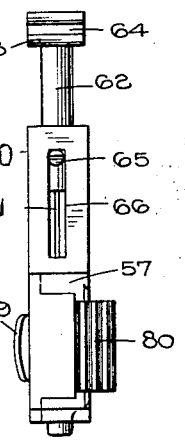
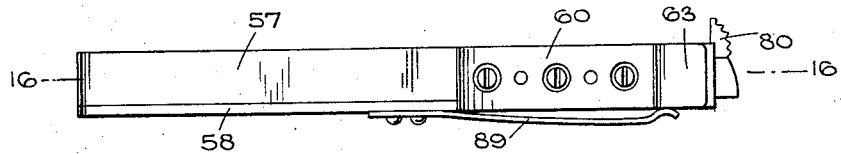
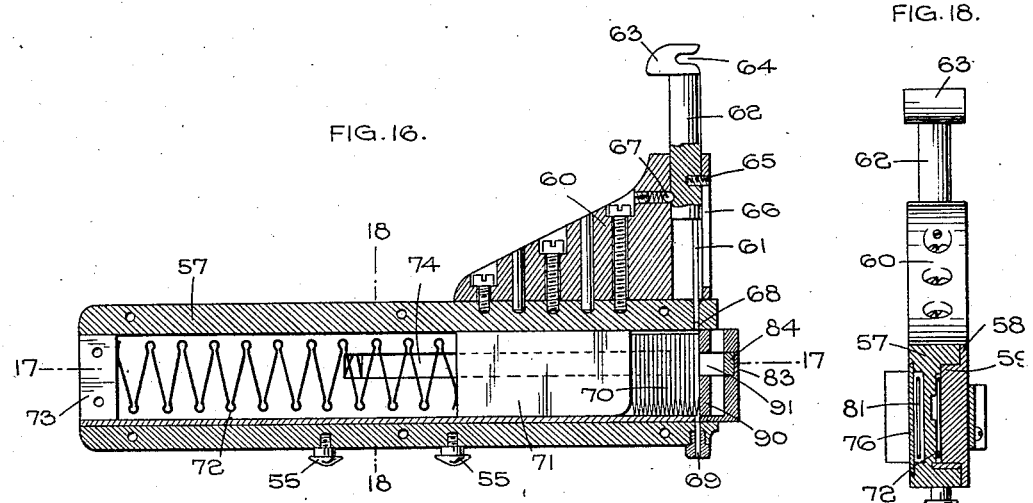
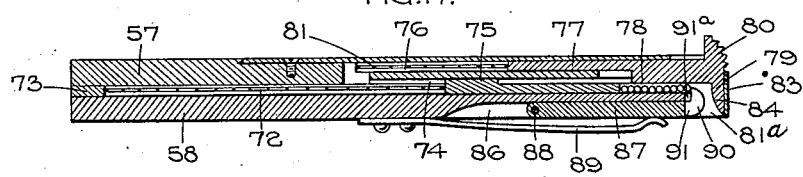
INVENTOR
George B. King
BY
ATTORNEYS July 21, 1931.  G. B. KING  1,815,777
GRAMOPHONE
Filed April 8, 1929   13 Sheets-Sheet 8
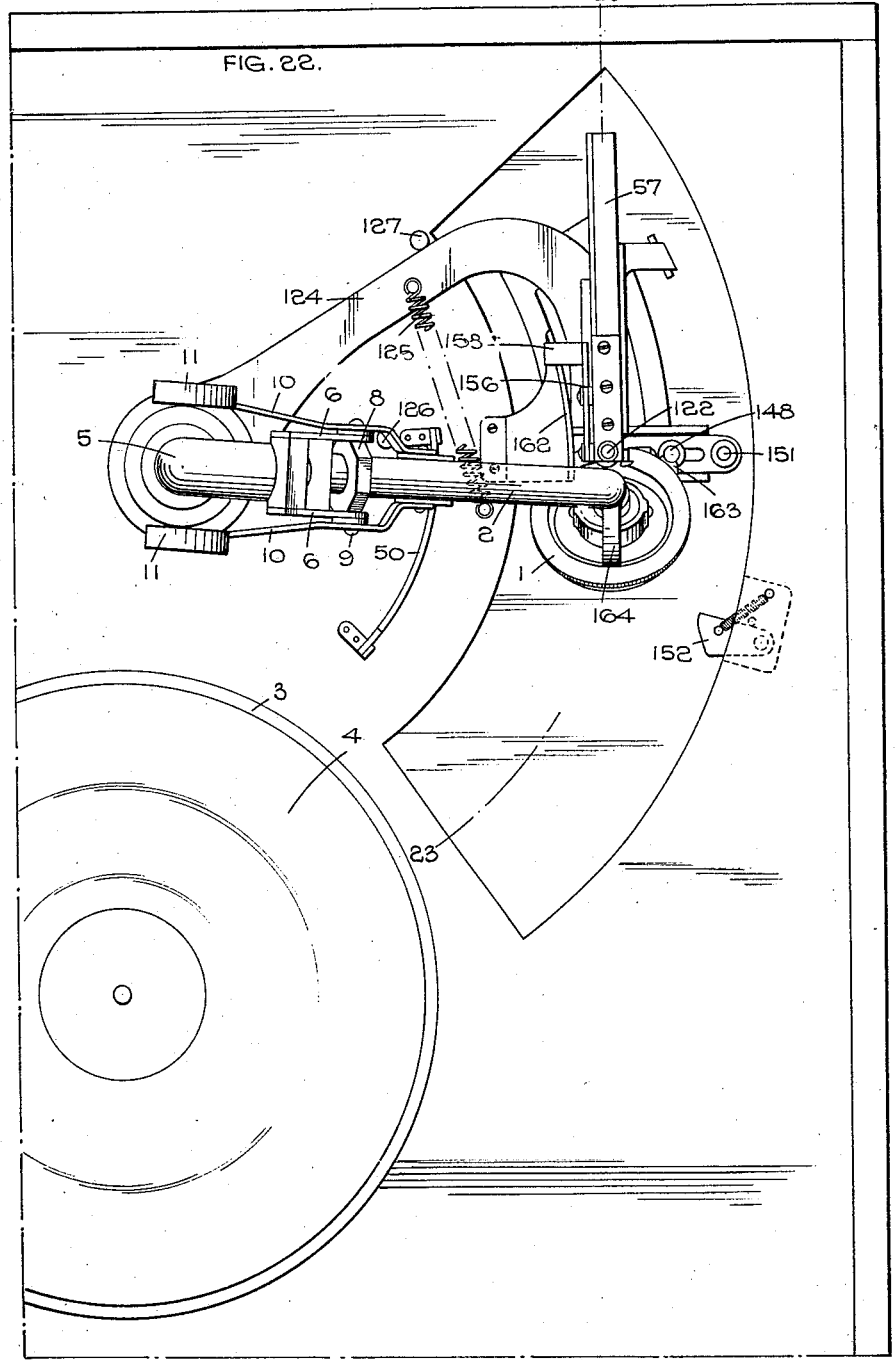
INVENTOR
George B. King
BY
ATTORNEYS July 21, 1931. G. B. KING 1,815,777
GRAMOPHONE
Filed April 8, 1929 13 Sheets-Sheet 9

INVENTOR
George B. King
BY
ATTORNEYS

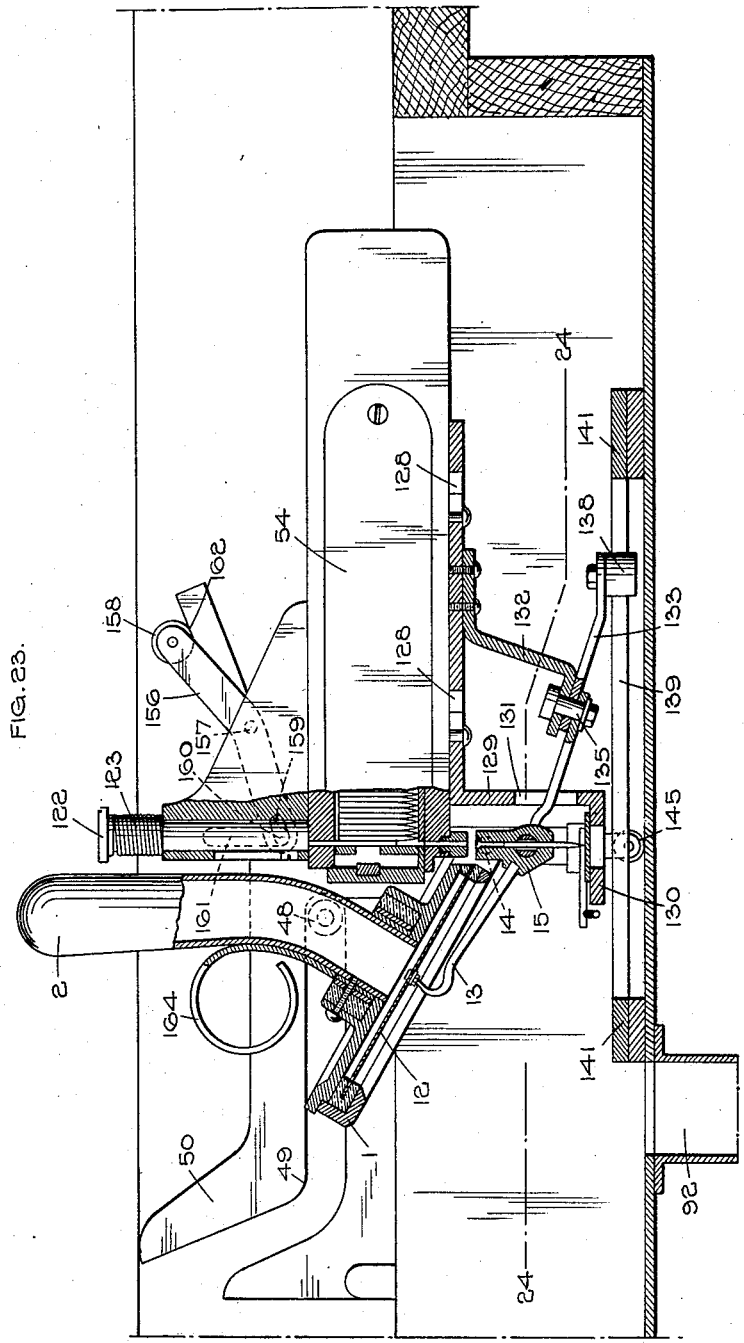

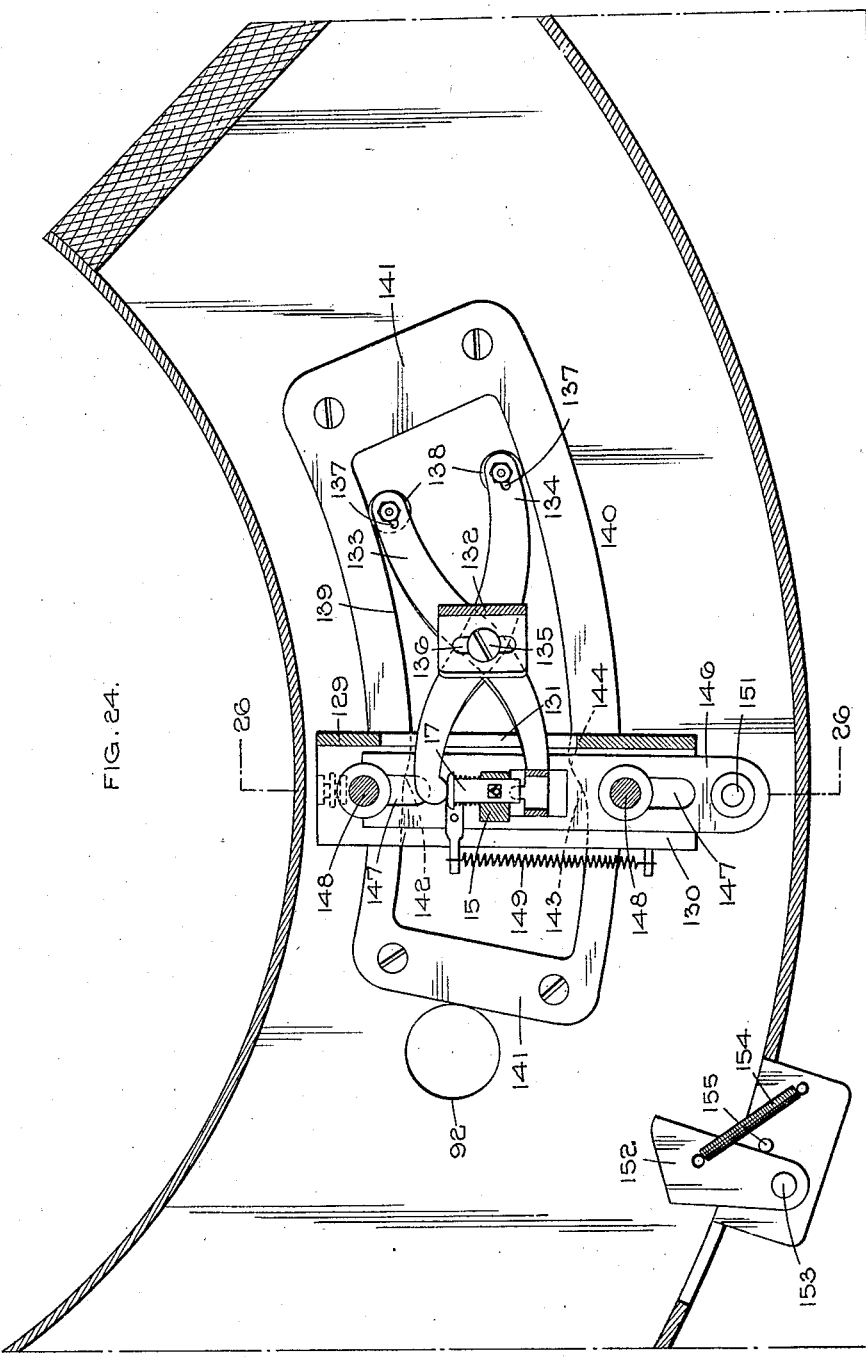

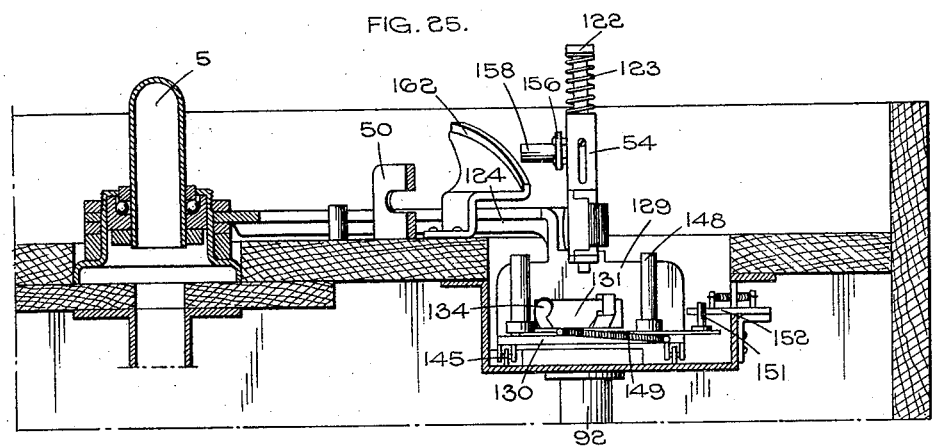
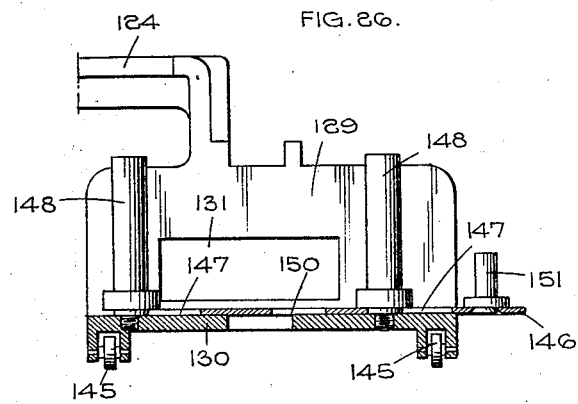

July 21, 1931. G. B. KING 1,815,777
GRAMOPHONE
Filed April 8, 1929 13 Sheets-Sheet 13

INVENTOR
George B. King
BY Munn&Co
ATTORNEYS

Patented July 21, 1931

1,815,777

UNITED STATES PATENT OFFICE

GEORGE BASIL KING, OF EDGBASTON, BIRMINGHAM, ENGLAND

GRAMOPHONE

Application filed April 8, 1929, Serial No. 353,542, and in Great Britain April 17, 1928.

This invention relates to gramophones and has for its object to provide means whereby the operation of emptying spent needles and inserting fresh ones may be simplified.

One of the objects of the present invention is to provide apparatus which will be relatively simple to construct and assemble and which will be certain in operation and which can be operated satisfactorily without the exercise of any particular skill.

A further object of the present invention is to provide apparatus for automatic needle changing which will not cause interference with the acoustic properties of the reproducer or which will cause a minimum of interference therewith.

A further object of the present invention is to provide apparatus which will operate satisfactorily with needles of any diameter within the usual range of diameters employed for gramophone needles.

A further object of the present invention is to construct the apparatus in such manner that the points of the fresh needles will not be damaged prior to their use.

The apparatus relates to that type of automatic needle changing gear wherein the arm of the gramophone which may be a hollow tone arm or which may, in the case of an electrical reproducer, be other than hollow, is swung to one side of the turntable for discharging the spent needle and receiving the fresh needle.

Referring to the drawings:—

Figure 5 is a view partly in section on line 5—5 of Figure 2 with the reproducer and magazine in elevation.

Figure 6 is a view similar to Figure 5 but with the sound box shown in section and the magazine partly in section.

Figure 7 is a plan view corresponding with Figure 6 but with the magazine removed.

Figure 13 is a side view showing one form of needle magazine.

Figure 14 is an end view thereof.

Figure 15 is a plan view of the magazine.

Figure 16 is a section on line 16—16 of Figure 15.

Figure 17 is a section on line 17—17 of Figure 16.

Figure 18 is a section on line 18—18 of Figure 16.

Figure 19 is a section on line 19—19 of Figure 10 with the needle in position.

Figure 20 is a section on line 20—20 of Figure 19.

Figure 22 is a plan view showing the construction illustrated in Figure 21 but with the parts in the loading position and the magazine in position.

Figure 23 is a section on line 23—23 of Figure 22.

Figure 24 is a section on line 24—24 of Figure 23.

Figure 25 is a section on line 25—25 of Figure 21 with the magazine in position.

Figure 26 is a section on line 26—26 of Figure 24 showing the magazine supporting arm.

Figure 1:
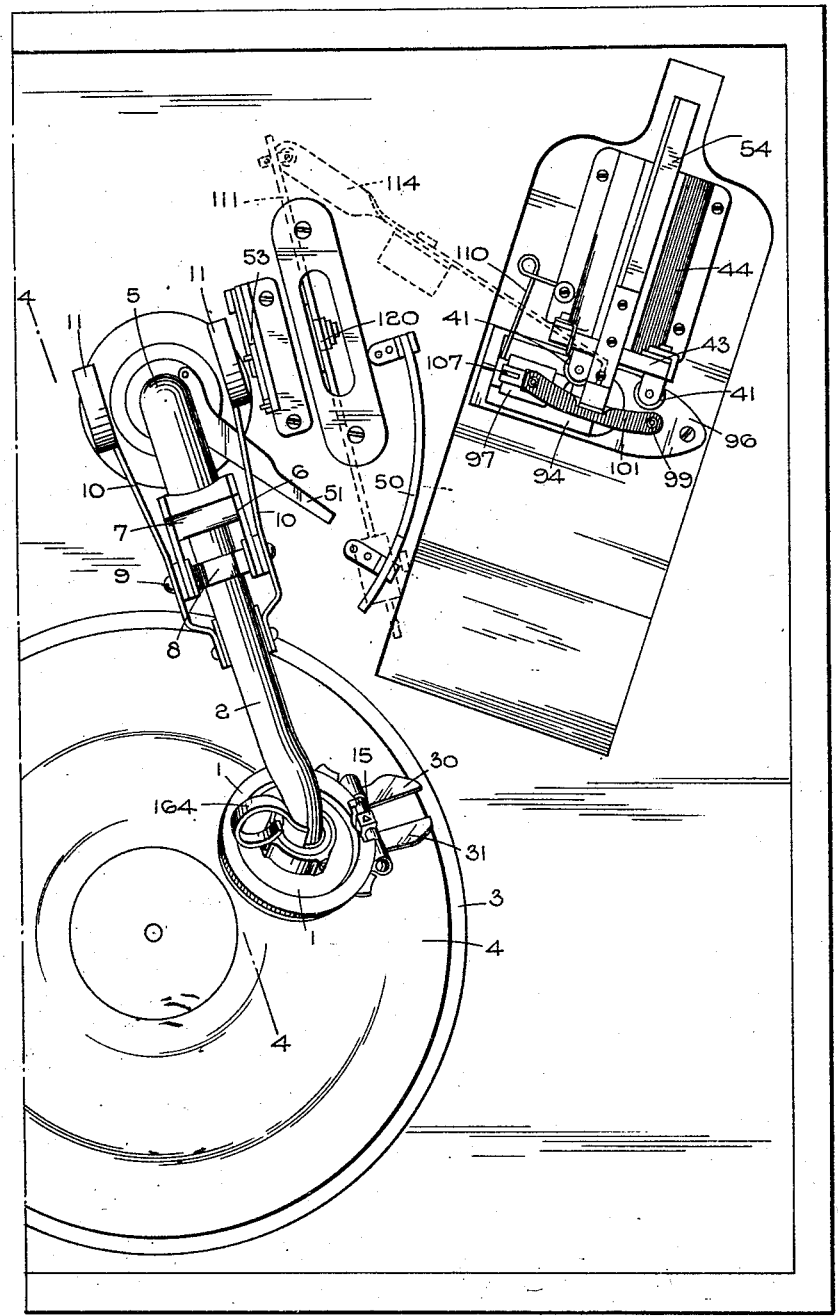
Figure 1 is a plan view showing one arrangement in accordance with the present invention.
Figure 2:
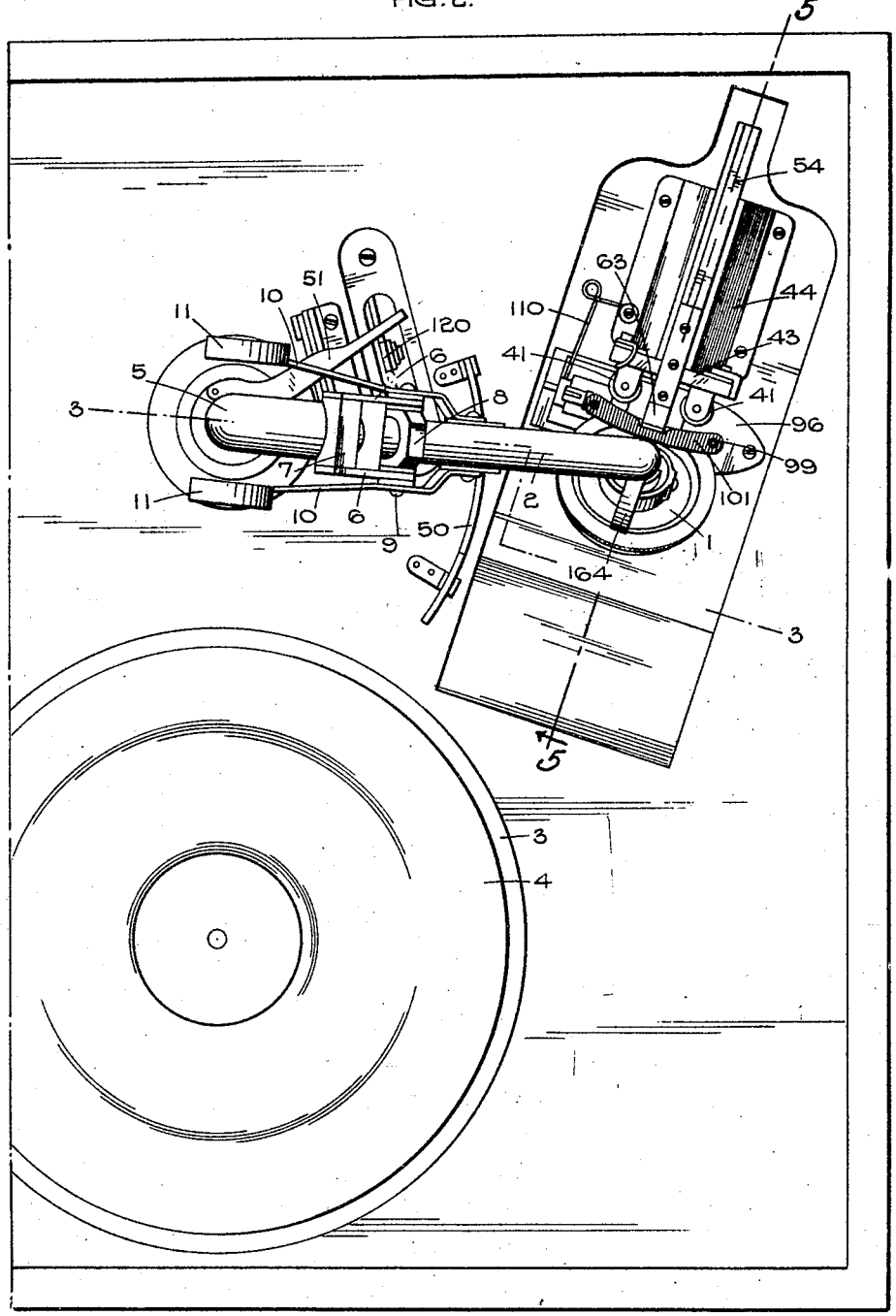
Figure 2 is a plan view showing the tone arm of the gramophone in the loading position.

In the construction illustrated in Figures 1 to 20, the invention is shown applied to a gramophone having a sound box 1 and tone arm 2 although it is to be understood that these may be replaced by an electrical reproducer which may be carried on a pivoted arm which, however, need not be hollow, or by a sound box and tone arm of the alternative construction described in my British specification No. 315,779.

In the arrangement shown the turntable is shown at 3 and a record 4 is in position.

The tone arm 2 has a second part 5 which is mounted to swing about a vertical axis in the well known way. The parts 2 and 5, however, are attached together pivotally as shown clearly in Figures 3 and 4.

The part 5 is provided with a bracket having two jaws 6 and the part 2 is provided with an end plate 7 of arcuate form adapted to swing in contact with the end of the part 5 and between the jaws 6.

The part 2 is further provided with a collar 8 which is pivoted at 9 to the jaws 6.

The part 2 may carry a pair of levers 10 each having a balancing weight 11 for the purpose of counter-balancing the additional weight of the sound box as compared with an ordinary sound box due to certain mechanism which is mounted thereon and which will be hereinafter described.

The sound box, see particularly Figure 6, has a diaphragm 12 to which is attached one end of a stylus bar 13 the stylus bar being pivotally or equivalently mounted at 14 and incorporating a needle gripper 15.

It is usual in gramophone sound boxes for the axis of the needle holder to be parallel to the plane of the diaphragm but it will be observed that we have adopted a construction in which the axis of the needle holder is set at an obtuse angle in relation to the plane of the diaphragm.

It will be observed that the needle gripper which is shown more clearly in Figures 19 and 20 is provided with a hole 16 which extends completely therethrough so that the needles can be fed in from the end opposite to that from which they project when working.

Further, it will be observed that the axis of the needle gripper and the plane of the diaphragm of the sound box if extended will both pass through the point about which the stylus bar as a whole is pivoted.

The needle gripper is designed to accommodate any diameter of needle which is within the usual range of diameters of gramophone needles and in the construction shown in Figures 19 and 20 the needle gripper comprises the member 15 having the continuous hole therethrough. The upper part of the hole may be of tapering form as shown and the hole may be of triangular section as shown in Figure 20 the needle contacting two sides of the triangle.

Extending transversely through the member 15 is a hole in which is placed a sliding pin 17 which forms the movable member of the needle gripper. This sliding pin has an enlarged head 18 under which operates a spring 19 tending to move the pin to the right as seen in Figure 19.

The pin 17 is provided with a rectangular hole 20 through which the shank of the needle passes and if required one end 21 of this hole may be of convex form as shown.

As shown in Figures 19 and 20 the needle holder is gripping a needle, the surface 20 pressing the needle laterally into the angle formed at the right hand side of the triangular hole through the member 15.

The pin 17 is slotted as shown at 22 and a pin 23 in the member 15 passes through this slot in order to prevent the pin 17 from turning on its own centre.

Further, the end of the pin 17 carries a transverse pin 24 which limits bodily the movement of the pin 17 under the influence of the spring 19.

It will be observed that if the head 18 of the pin is pushed towards the member 15, the convex surface 21 will move away from the shank of the needle so that the needle will then be released. In order to prevent the needle from remaining in the angle of the triangular hole 16 (see Figure 20) the opposite end 25 of the opening 20 advances towards the right hand side of the needle and pushes it out of the angle so that it is positively released and will therefore drop under gravity.

The upper part of the member 15 is provided with lateral trunnions or bosses 26 the axis of which is parallel to the axis of the pin 17 and these trunnions are engaged by pins 27 with balls 28 interposed between the ends of the pins and the ends of the recesses 29 in the trunnions 26.

By mounting the member 15 in this manner it is able to pivot about the axis 14 which is of course the centre line of the pins 27.

For operating the pin 17 to release and eject the needle we may provide a pair of levers 30, 31 these levers being pivoted at 32 and 33 respectively to a bracket 34 which is fixed to the sound box.

The two levers 30, 31 are acted upon by a spring 35 which tends to move them apart and they are each provided with a heel piece 36 between which is a stop 37 formed by the head of a screw so that the outward movement of the two levers under the pressure of the spring 35 is limited.

The lever 30 is provided with a pair of cheeks 38 which are adapted to come into contact with one side of the member 15 while the lever 31 is adapted to engage the head 18 of the pin 17.

Both levers are provided with inclines 39 and the lever 31 is provided with a projection 40.

The levers are operated to release the needle gripper when the tone arm 2 is swung to the side of the turntable, inclines 39 of the levers coming into contact with rollers 41 mounted on a carriage 42 which is slidably mounted in guides 43 fixed to a bracket 44 on the structure of the machine at the side of the turntable.

It will be observed that the carriage 42 can slide in a direction parallel to the axis of the pin 17 so that the two rollers 41 are self centering in relation to the levers 30 and 31, the two levers consequently being operated simultaneously it being impossible to exert pressure on one side of the needle gripper without exerting an equal and opposite pressure upon the opposite side.

Thus when release of the needle gripper occurs, the member 15 is supported by the cheeks 38 as soon as the pin 17 commences to be moved by the lever 31.

In the construction illustrated, however, the carriage 42 is slidably mounted and it may be acted upon by a spring such as 45 and a stop plate 46 may be provided limiting its movement under the action of the spring.

It should be observed that the lever 31 which operates the pin 17 is provided with the projections 40 so that the pin 17 will be moved inwardly a sufficient distance to enable its surface 25 to push the gramophone needle out of the angle of the slot in the member 15 but the projections 40 will pass the roller 41 before the loading position is reached so that the pin 17 is permitted to move back again sufficiently far to enable the fresh needle to enter the gripper without encountering obstruction from the pin 17.

Figure 3:
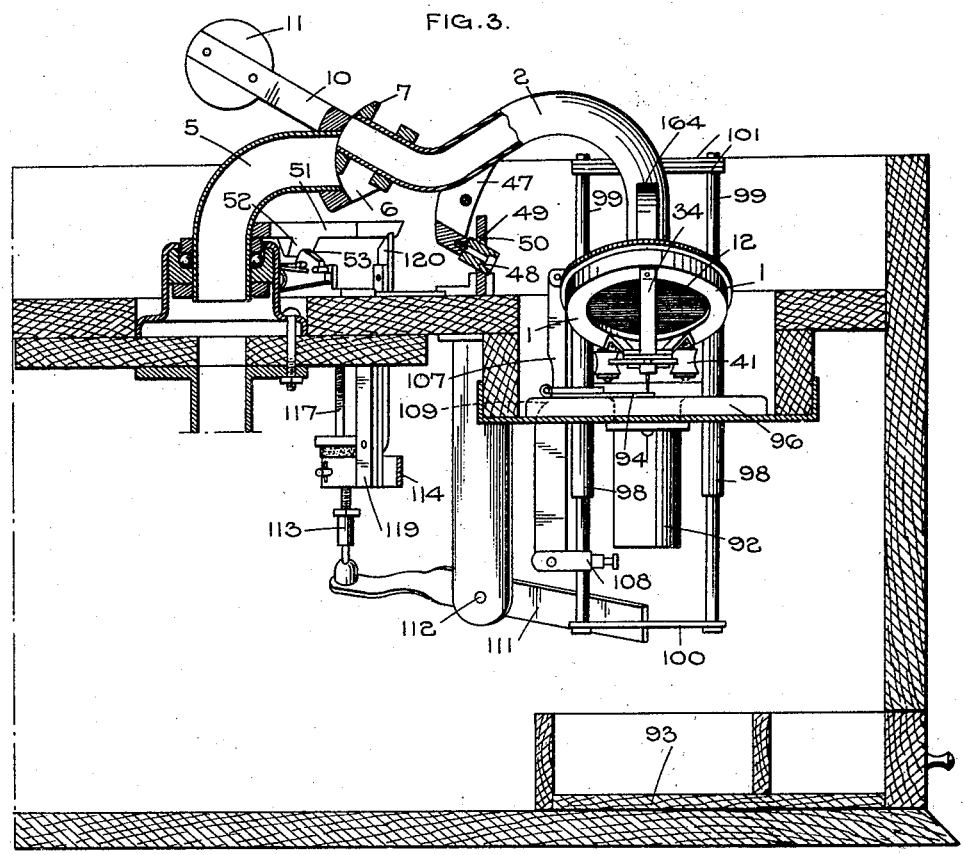
Figure 3 is a section on line 3—3 of Figure 2.
Figure 4:
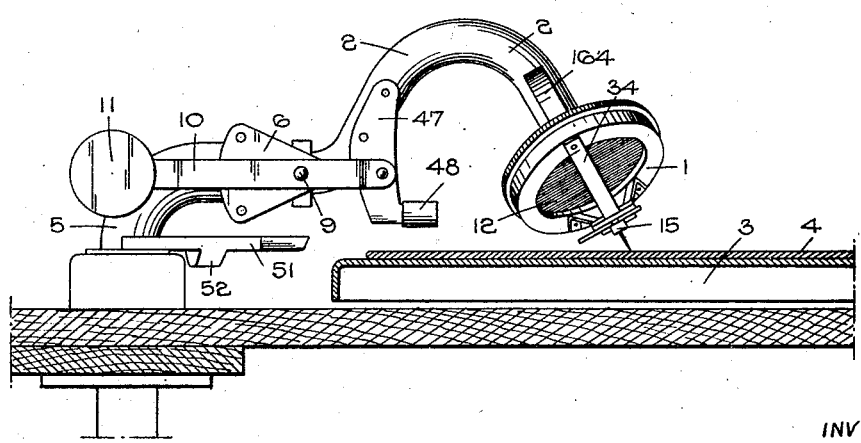
Figure 4 is a section on line 4—4 of Figure 1.
Figure 8:
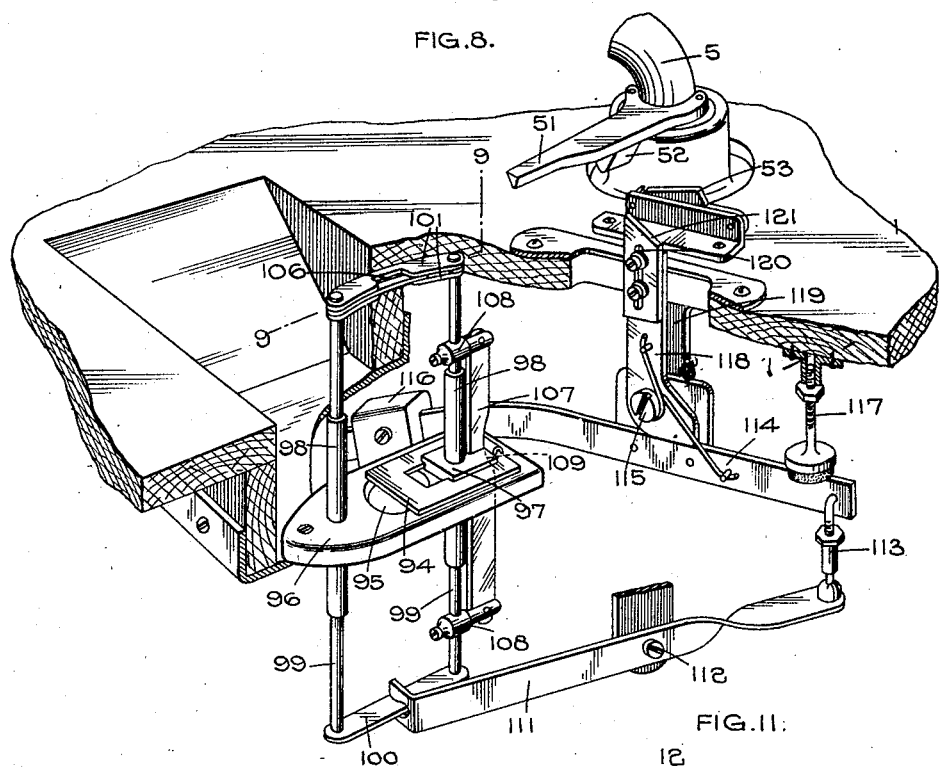
Figure 8 is a perspective view showing a part of the operating mechanism.
Figure 10:
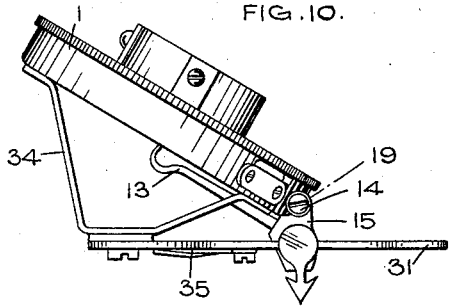
Figure 10 is a side view of the sound box and associated parts.

Referring particularly to Figure 3 it will be seen that the tone arm part 2 is provided with a downwardly projecting bracket 47 which bracket carries a roller 48. This roller engages in a slot 49 in a guide member 50 fixed at the side of the machine this engagement ensuring that when the tone arm is swung to the side of the turntable it will be moved into the correct position relative to the rollers 41 and a needle feeding mechanism. Further the provision of the guide 50 ensures that the tone arm will be moved into a position to bring the axis of the needle gripper substantially vertical, this provision being desirable in order to ensure that the spent needle will drop out of the gripper immediately the gripper is released. The pivotal joint 9 in the tone arm enables the tone arm part 2 to move into the required position.

The tone arm part 5 is provided with a projecting arm 51 having a wedge shaped projection 52 on its under side and when the tone arm is swung into the loading position the projection 52 rides over a spring pressed nose 53 which enables the operator to feel when the movement is complete. If the operator moves the edge of the projection 52 over the highest point of the nose 53 the spring pressure on the nose 53 may be sufficient to ensure that the movement is completed.

The needle magazine 54 is provided with projecting studs 55 adapted to engage keyhole slots 56 in the bracket structure 44 enabling the magazine to be definitely positioned on the bracket structure.

The magazine is shown clearly in Figures 13 to 18 and the construction shown in these figures is one which enables the magazine to be fed with needles conveniently by hand. Other forms of mechanism may be used if desired but it will be understood that it is necessary to provide an ejecting plunger for feeding the needles one by one from the magazine into the needle gripper of the gramophone.

In the construction shown in Figures 13 to 18 the magazine comprises a body 57 of channel section the open side of the channel being closed by a front plate 58 which has its centre portion 59 thickened so as to fit within the channel of the body 57.

The body portion 57 is provided with a guide block 60 which carries an ejecting plunger 61 for feeding the needles out of the magazine into the needle gripper.

The plunger 61 is carried by a sliding operating pin 62 which may have a head 63 slotted at 64.

The operating member 62 is provided with a guide pin 65 sliding in the slot 66 in the block 60 and the operating member 62 may be normally retained in its inoperative position by a spring pressed ball 67 engaging in a recess in the lower part of the operating member.

The plunger 61 is guided in a hole 68 in the body 57 and a guide 69 is provided for each needle as it leaves the magazine.

The needles 70 are placed in the magazine side by side with all their points projecting towards the side having the outward guide 69. The needles are acted upon by a pressure plate 71 which is pressed by a light spring 72 the opposite end of which forms an abutment against a fixed plate 73. Thus whenever the end needle of the row is ejected and the plunger 61 returns to the position shown in Figure 16 the needles will advance by an amount equal to the diameter of one needle.

In the back of the body 57 is a slot 74 and the back of the plate 71 may have a projection 75 engaging in the slot 74 so that it is guided thereby.

The body 57 is provided with a further slot 76 in which is a slide 77 having a rib 78 which slides in the groove 74 and having a forwardly projecting piece 79 at its end. In addition the slide 77 has a finger piece 80.

The spring 81 is arranged in the groove 76 which spring tends to force the slide 77 outwardly.

The front plate 58 is provided with a slot or opening 81a one side 82 of which engages the end 79 of the slide 77 so as to limit its outward movement. The part 82 is slotted at 83 to receive the end piece 79 of the slide 77 and the inner surface 84 of the part 79 and the inner surface 85 of the part 82 are both inclined or curved as shown.

The plate 58 is slotted as shown at 86 and in the slot is a hooklike retaining member 87 pivoted at 88 and acted upon by a plate spring 89.

The end of the retaining member 87 is formed as a hook 90 and this hook engages in the opening 81a in the plate 58 and is slotted as shown at 91 to allow the part 79 to move up to the side 91a of the opening 81a.

The needles are fed through the space between the parts 79 and 90 by hand one by one and after each needle has been inserted the finger piece 80 is pushed causing the slide 77 to move in an endwise direction and force the needle past the retaining hook 90. When the needle has passed into the magazine the retaining hook 90 springs back under the influence of the pressure of the spring 89 and retains the needle in position.

When the needle gripper 15 releases the spent needle it is desirable that this needle should be permitted to drop free of the machine and for this purpose a tube or chute 92 may be provided down which the spent needles can pass and the tube or chute 92 may deliver the spent needles into a drawer 93 or other receptacle in the cabinet.

The needles may be released before the loading position (shown in Figure 6) is reached and in the construction illustrated the needles are released before this position is reached, the needle gripper being moved into its open or released position and retained in such position by the levers 30, 31 during the loading operation and the needle gripper remaining released until the tone arm has been moved back towards the turntable sufficiently for the levers 30, 31 to leave the rollers 41.

Thus there is a period after the fresh needle has been fed into the needle holder during which the needle is not gripped because the needle holder has not been allowed to close on to the needle. During this period it is necessary to support the needle in the needle holder and for this purpose a moving table 94 is provided. It is necessary that this table should be operative for supporting a needle in the needle holder from the moment when the fresh needle enters the holder until the needle holder has gripped the needle but it is also necessary that the supporting table 94 should not impede the fall of spent needles when the tone arm is moving from the turntable to the loading position. For this reason the table 94 is movably mounted. Referring particularly to the Figure 8 the table 94 is shown to be slidably mounted over a hole 95 in a fixed plate 96 the table being guided in grooves in the edges of a plate 97.

The plate 96 is provided with a pair of tubular guides 98 in which slide the vertical members 99 of stirrup structure the lower member of which is shown at 100 and the upper member of which is shown at 101. The upper member is of compound construction including upper and lower plates 101 and an intermediate plate 102 which is pivotally mounted on one of the posts 99 and is acted upon by a spring 103 mounted on the other post 99. A pin 104 mounted in the lower plate 101 and engaging a slot 105 limits the swinging movement of the plate 102, the arrangement being such that the plate 102 can swing to uncover the slots 106 in the plates 101 when required.

The purpose of the plate 102 is to engage the slot 64 in the plunger operating pin 62 of the magazine and if the magazine is removed for refilling purposes and then replaced the spring plate 106 is able to spring into the slot 64 when the stirrup 99, 100 and 101 has moved into the correct position.

For sliding the plate 94 back and forth a cam plate 107 is provided attached to a pair of blocks 108 slidably mounted on one of the members 99. The cam plate 107 is provided with an incline 109 which engages the plate 94 when the cam plate rises and slides the plate 94 so as to uncover sufficient of the hole 95 to allow the released needle to drop therethrough. When the structure or stirrup consisting of the rods 99 and the members 100 and 101 moves downwardly, however, the plate 94 is advanced over the hole 95 by means of a spring 110 (see Figure 7).

The stirrup consisting of the members 99, 100 and 101 is operated to rise and fall by means of a lever 111 pivoted at 112 to a suitable bracket and having an adjustable connection 113 to a lever 114 pivoted at 115, the lever 114 carrying a weight 116 at its opposite end.

An adjustable stop 117 is provided limiting the motion of the lever 114 under the influence of the weight 116.

The lever 114 is operated by means of a lever 118 pivoted on the centre 115 to a bracket 119, the lever 118 having an adjustable nose piece 120 one surface of which 121 is inclined.

The lever 118 is operated by the arm or projecting piece 51 on the tone arm 5. As the tone arm is swung to the side of the turntable the member 51 engages the part 120 and swings the lever 118 which operates the lever 114 the motion being transmitted thence to the stirrup 99, 100 and 101 by the connection 113 and the lever 111. The stirrup is thus raised and the plate 94 withdrawn from the hole 95 as the tone arm is approaching its loading position.

When the tone arm reaches its loading position the member 51 moves clear of the part 120 so that the levers 118 and 114 are thus released, the weight 116 causing them to return to their normal position and in doing so to lower the stirrup 99, 100 and 101 this movement causing the plate 94 to return to its operative position for supporting the fresh needle slightly in advance of the feeding of a fresh needle from the magazine by the operation of the pin 62 by the plate 106.

When the tone arm is returned to its position over the turntable it rides freely over the lever 118 by engaging the incline 121 and swinging the lever 118 without, however, moving the lever 114.

In the construction shown in Figures 21 to 26 the sound box 1, turntable 3 and tone arm 2 and 5 together with the guide 50 and the parts 47, 48 and 49 are constructed substantially as described with reference to Figures 1 to 20.

In the construction shown in Figures 21 to 26 the needle magazine 54 may also be of substantially the same form as that described with reference to Figures 13 to 18 except that the head 63 is replaced by a flat head 122 under which may be a coiled spring 123.

In this construction the magazine is detachably mounted upon a supporting arm 124 mounted so that it can swing about the same centre as the part 5 of the tone arm.

The arm 124 is acted upon by a spring 125 and is adapted to move between stops 126 and 127.

The arrangement is such that the tone arm can be swung to the side of the turntable and will engage with a suitable part of the arm 124 after which the tone arm and the arm 124 will move together until the arm 124 comes into contact with the stop 127.

The free end of the arm 124 is provided with keyhole slots 128 for engagement by the studs on the under side of the magazine and the free end of the arm is downwardly cranked as shown at 129 and has its extremity 130 extending horizontally.

A part 129 is slotted as shown at 131 and on the under side of the arm 124 is fixed a depending bracket 132 to which a pair of scissor like levers 133 and 134 are attached by a pivot pin 135.

A bracket 132, however, is slotted as shown at 136 in order to allow the levers 133 and 134 to centre themselves in relation to the needle gripper.

Figure 11:
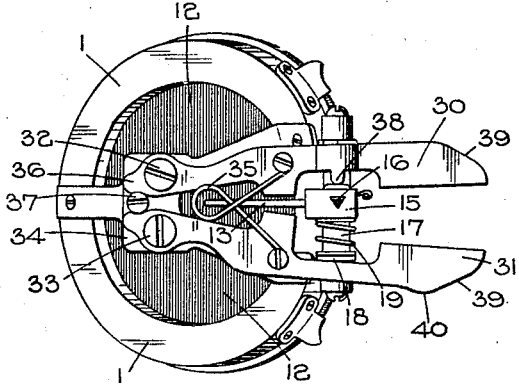
Figure 11 is a plan view thereof.
Figure 12:
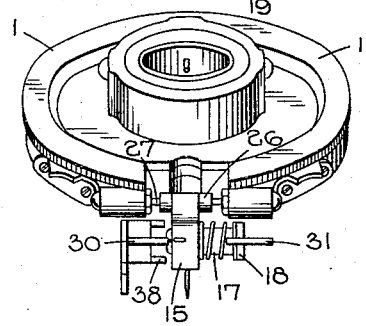
Figure 12 is a front view.
Figure 9:
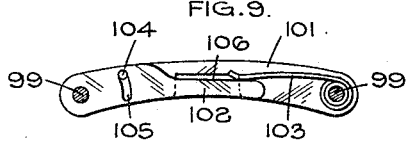
Figure 9 is a section on line 9—9 of Figure 8.

It will be understood that the needle gripper operating levers 30 and 31 shown in Figure 11 are omitted from this construction and the levers 133 and 134 are employed in their place and operate in substantially the same manner.

One end of each lever 133, 134 is slotted as shown at 137 and rollers 138 are provided the axle pins of which engage the slots 137.

These rollers 138 engage the surface 139 and 140 of a cam plate 141 fixed to the structure of the machine, the surfaces 139 and 140 including inclines 142 and 143 which cause the levers to be closed on the gripper when the arm 124 is swung towards the stop 127.

Further, the surface 140 adjacent to the incline 143 is provided with a projection 144 causing the lever 134 to make an ejecting movement in the same way that the lever 31 operates as has already been described.

As the arm 124 and the parts associated therewith may be of considerable weight the arm may be provided with a supporting roller 145 adapted to run on the fixed structure at the side of the turntable.

For supporting the fresh needle in the open needle gripper a movable sliding table 146 is provided, this table sliding on the part 130 of the arm 124.

Figure 21:
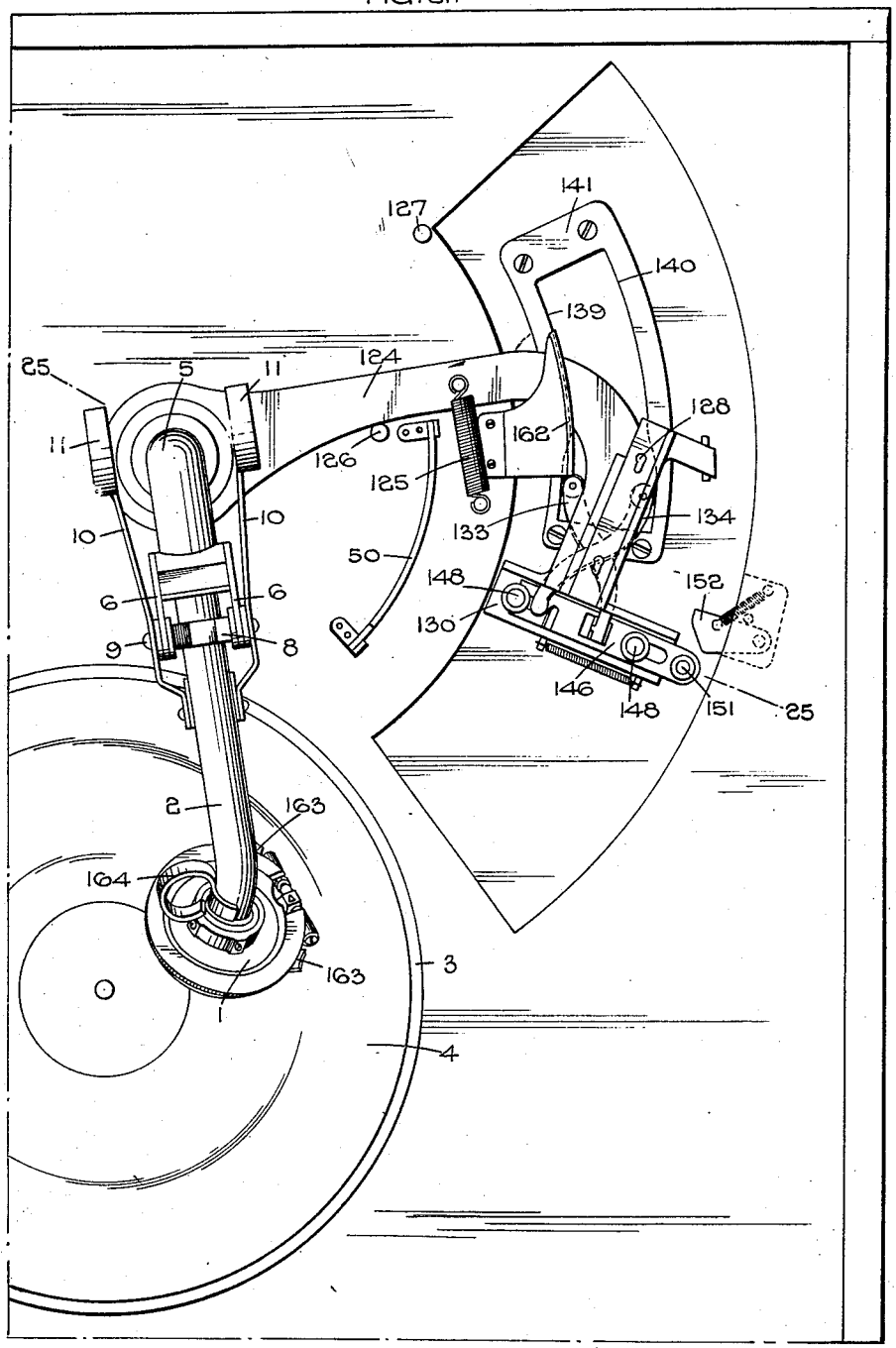
Figure 21 is a view in plan showing a further construction, the magazine being omitted for the sake of clearness.

The table 146 is slotted as shown at 147 the slots being engaged by posts 148 and the table being acted upon by a spring 149 so that normally it occupies the position shown in Figure 21. The table is further provided with an opening 150 which is normally out of line with the needle gripper. On the arm 124 being moved towards the stop 127, however, the end 151 of the table 146 is engaged by a pivoted cam piece 152 causing the table to slide in a manner to bring the opening 150 directly under the needle gripper so that the released needle can drop through the opening into the tube 92 provided for it. The tube 92 may lead the spent needle into a drawer similar to the drawer 93.

The cam piece 152 is pivoted at 153 and acted upon by a tension spring 154, a stop 155 being provided to limit the motion of the cam piece 152 under the influence of its spring.

Having passed the cam piece 152 the table 146 automatically returns to its original position with the hole 150 out of line with the needle gripper so that it is now in a position to support the fresh needle to be inserted from the magazine.

For operating the plunger pin 62 of the magazine the latter may be provided with a lever 156 pivoted at 157 to the magazine itself one end of the lever 156 having a roller 158 and the other end having a slot 159 which engages a pin 160 projecting laterally from the pin 62. A slot 161 is provided in the plunger guide to allow the pin 160 to pass up and down.

The lever 156 is operated by engaging a fixed cam 162 which is mounted upon the stationary structure at the side of the turntable and the feeding of the needle may take place while the tone arm and the magazine arm 124 are moving together, there being no relative movement between them during the feeding operation.

On the return movement the arm 124 will follow the tone arm by reason of the pressure exerted by the spring 125 and the needle will be supported on the table 146 until after the gripper has been allowed to close.

For positioning the sound box in relation to the end of the arm 124 the sound box may be provided with two projecting plates 163 which come into contact with the posts 148.

Figure 27:
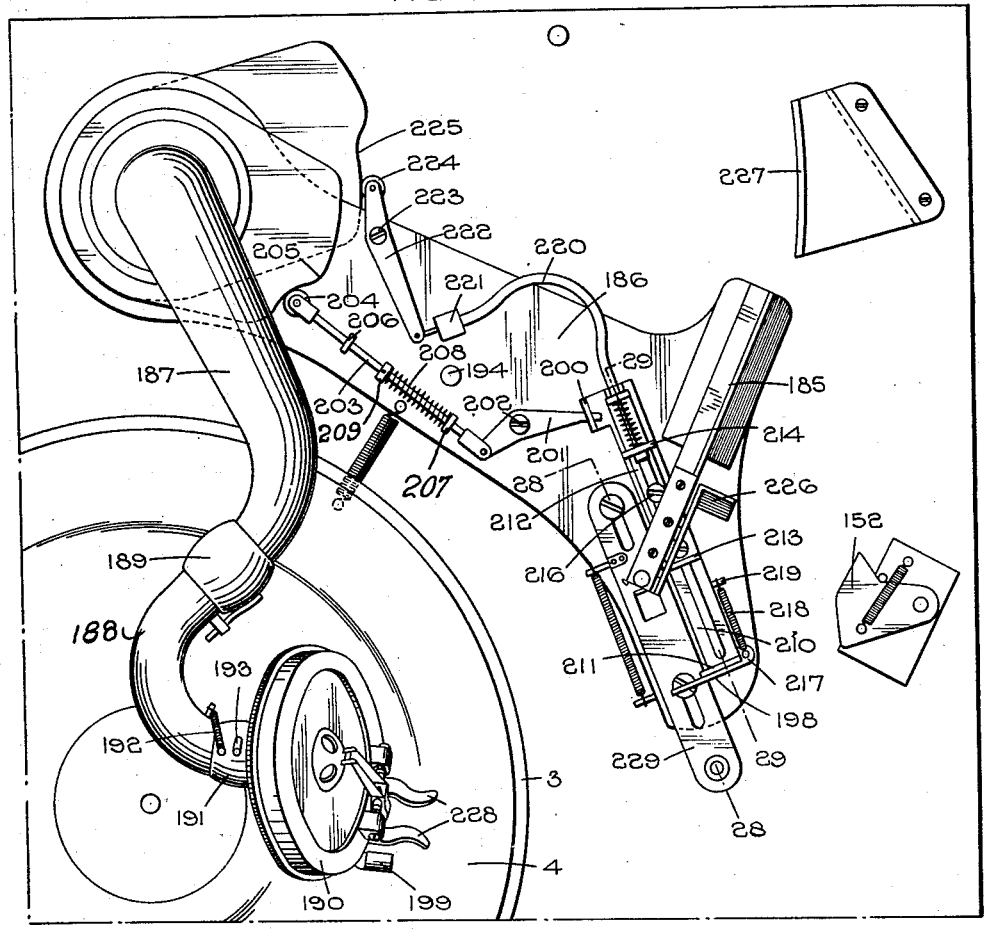
Figure 27 is a plan view showing a further construction.
Figure 28:
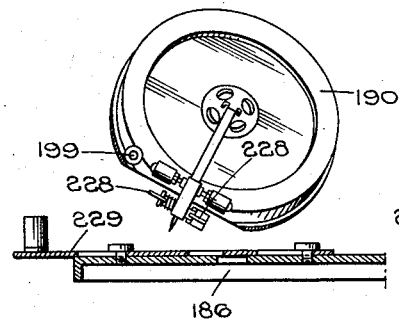
Figure 28 is a section on line 28—28 of Figure 27.
Figure 29:
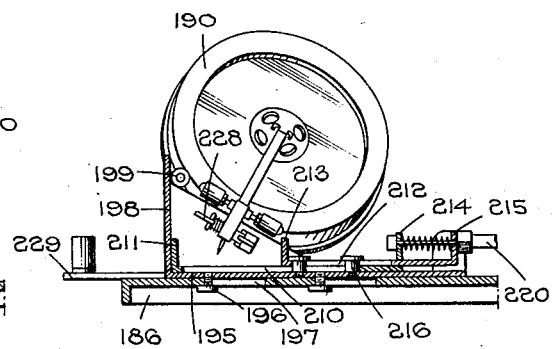
Figure 29 is a sectional view on line 29—29 of Figure 27.

In the construction shown in Figures 27, 28 and 29, the magazine 185 carrying the supply of fresh needles is mounted upon an arm 186 which is similar to the arm 124 in as much as it is pivoted about the same centre as that upon which the tone arm turns.

In the arrangement shown in Figures 27, 28 and 29, the tone arm is in two parts 187 and 188 between which is a pivoted joint 189 which allows the sound box to be turned upwardly away from the record when required. The joint 189, however, is provided with a stop limiting the downward movement of the part 188.

The sound box 190 is preferably mounted by means of the joint 191 on the end of the part 188 so that the sound box can turn about a horizontal axis at right angles to the axis of the pivot of the needle holder this movement taking place against the action of a spring 192, the motion being limited by a pin and slot connection 193. This movement is provided to allow the sound box to be rotated to bring the needle into substantially vertical position so that when the needle holder is released a needle will move freely therein by gravity.

This movement of the sound box is effected automatically when the tone arm is swung to the side of the turntable and caused to swing the arm 186. On the arm 186 is a stop 194 which is engaged by the tone arm so that further movement of the tone arm causes the arm 186 to swing on its pivot.

On the arm 186 is mounted a sliding plate 195, this plate having pins 196 which slide in guide slots 197 on the arm 186.

The end of the plate 195 is turned upwardly as shown at 198 and the part 198 is adapted to engage the roller 199 mounted on the sound box so that when the plate 195 is moved to the right (see Figure 29) the sound box is rotated about its own centre until the needle comes into a substantially vertical position (as seen in Figure 29).

The necessary sliding movement is imparted to the plate 195 by providing the plate 195 with a lug 200 having an opening in which engages one end of a lever 201 pivoted at 202 to the arm 186. The lever is operated by a sliding rod 203 having a roller 204 which engages a fixed cam 205.

The rod 203 is suitably guided by guides 206 and 207 and a spring 208 is provided acting on a collar 209 to keep the roller 204 in contact with the cam.

Thus when the arm 186 is swung, the plate 195 slides in such manner as to pull the sound box into the required position.

The means for releasing the needle gripper are mounted on the plate 195 and consist of a plate 210 having an upwardly projecting end 211 and a plate 212 having an upwardly projecting end 213.

The plate 210 is provided with an ear 214 by which it may be operated while the plate 212 is provided with an ear 215 by which it may be operated.

The two parts 211 and 213 form the means of operating the needle gripper and it will be seen that both the plates 210, 212 have a floating movement substantially parallel to the axis of the movable member of the needle gripper both of these plates being slotted and guided on pins 216 provided on the plate 195.

The plate 195 is provided with an ear 217 which is connected by a light spring 218 to a projection 219 on the plate 210.

The gripper 211, 213 is operated by means of a Bowden cable 220 the outer member of which engages the part 215 and the inner member of which engages the part 214.

At its opposite end the Bowden cable 220 has its outer member engaging a bracket 221 and its inner member engaging a lever 222 pivoted at 223 to the arm 186.

The second arm of the lever 222 has a roller 224 which engages a fixed cam 225 when the arm 186 is swung so that the needle gripper is operated at the correct time.

Levers 228 may be pivoted to a bracket on the sound box for engaging the needle gripping device upon opposite sides and the members 211 and 213 may engage these levers.

The needle magazine may be arranged so that the fresh needles are fed one by one by means of a plunger operated by a projection 226 engaging the fixed cam 227.

Instead of mounting the plate 195 and the operating means for the needle gripper which are carried thereon but have a simple sliding movement on the arm 186 the plate 195 carrying the needle gripper operating means may be mounted so that it can pivot on a horizontal pivot in addition to sliding. By this means the parts 198, 211 and 213 may move in a curved path and may follow the needle gripper round as the sound box turns and the amount of clearance between the parts 211 and 213 may be very considerably reduced.

The sliding table 229 is arranged similarly to the table 146 already described and is operated in substantially the same manner.

In all the constructions described the tone arm may be provided with a handle such as 164 to facilitate its movement.

Further, although in the constructions illustrated the tone arm is adapted to be moved by hand it is to be understood that the tone arm and/or the second arm may be moved by power such as electrical power or the power of the turntable motor if required.

In order to provide an arrangement by which different qualities or different diameters of needle may be used a plurality of magazines may be provided and each magazine having its own ejecting plunger. When it is desired to employ a different quality of needle one magazine is taken off and another one mounted in its place.

What I claim then is:—

1. In a gramophone the combination of an arm having a reproducer, a stylus bar, and a quick release needle gripper, the reproducer being mounted for swinging movement to the side of the turntable, and means whereby such swinging movement of the reproducer produces in succession a series of operations including the release of the needle gripper, the actuation of a supporting table beneath the gripper and the feeding of a fresh needle into the gripper, and means actuated by the return movement of the reproducer for producing a different sequence of operations.

2. In a gramophone the combination of an arm having a reproducer, a stylus bar, and a quick release needle gripper, the reproducer being mounted for swinging movement to the side of the turntable, and means whereby such swinging movement of the reproducer produces in succession the release of the needle gripper, the actuation of a supporting table beneath the gripper and the feeding of a fresh needle from the magazine into the gripper, and means actuated by the return movement of the reproducer producing the closing of the gripper on to the needle.

3. In a gramophone the combination of an arm having a reproducer, a stylus bar and a quick release needle gripper, the reproducer being mounted for swinging movement to the side of the turntable, automatic means for releasing the needle gripper, supporting means for a needle magazine, means for storing up energy produced by said swinging movement, and means for subsequently releasing such energy to feed a fresh needle from a magazine.

4. In a gramophone the combination of an arm having a reproducer, a stylus bar, and a quick release needle gripper, the reproducer being mounted for swinging movement to the side of the turntable, automatic means for releasing the needle gripper, supporting means for a needle magazine, a weight mounted for rising and falling movement, means operated by said reproducer for raising the weight when the swinging movement takes place and means for feeding a fresh needle into the gripper, said means being actuated by the energy stored up by raising the weight.

5. In a gramophone the combination of an arm having a reproducer, a stylus bar, and a quick release needle gripper, the arm carrying the reproducer being mounted for movement to the side of the turntable, automatic means for releasing the needle gripper, supporting means for a needle magazine, a weight mounted for rising and falling movement, a trip lever for raising said weight by movement of said arm and means for feeding a fresh needle into the gripper, said means being actuated by the energy stored up by raising the weight.

6. In a gramophone the combination of an arm having a reproducer, a stylus bar, and a quick release needle gripper, the arm carrying the reproducer being mounted for movement to the side of the turntable, automatic means for releasing the needle gripper, supporting means for a needle magazine, means for feeding a needle from a magazine into the open gripper, a support for the needle in the open gripper until the gripper closes thereon, means for storing up energy produced by said swinging movement and means for subsequently releasing such energy to operate said needle support.

7. In a gramophone the combination of an arm having a reproducer, a stylus bar, and a quick release needle gripper, the arm carrying the reproducer being mounted for movement to the side of the turntable, automatic means for releasing the needle gripper, supporting means for a needle magazine, a lever pivoted to a stationary part of the machine, a weight on said lever, a pivoted trip piece on said lever positioned for operation by said arm, and means for feeding a fresh needle into the gripper, said means being actuated by the energy stored up by raising the weight.

8. In a gramophone the combination of an arm having a reproducer, a stylus bar, and a quick release needle gripper, the arm carrying the reproducer being mounted for movement to the side of the turntable, automatic means for releasing the needle gripper, supporting means for a needle magazine, a lever pivoted to a stationary part of the machine, a weight on said lever, a pivoted trip piece on said lever positioned for operation by said arm and means for feeding a fresh needle into the gripper, and support for the needle in the open gripper until the gripper closes thereon, said needle being movable and operated by the movement of said weight.

9. In a gramophone the combination of an arm having a reproducer, a stylus bar, and a quick release needle gripper, the reproducer being mounted for swinging movement to the side of the turntable, automatic means for releasing the needle gripper, a needle magazine, a plunger associated with said magazine for feeding the needles one by one into gripper, and means controlled by the swinging movement of the reproducer, for operating said plunger.

10. In a gramophone the combination of an arm having a reproducer, a stylus bar, and a quick release needle gripper, the arm carrying the reproducer being mounted for movement to the side of the turntable, automatic means for releasing the needle gripper, a needle magazine, a plunger associated with said magazine for feeding the needles one by one into the gripper, and means controlled by the swinging movement of the reproducer, for operating said plunger.

11. In a gramophone the combination of an arm having a reproducer, a stylus bar, and a quick release needle gripper, the arm carrying the reproducer being mounted for movement to the side of the turntable, to bring the needle into a substantially vertical position, guiding means for ensuring that said position is reached, automatic means for releasing the needle gripper, a needle magazine, a plunger associated with said magazine for feeding the needles one by one into the gripper, means controlled by the swinging movement of the reproducer, for operating said plunger, a movable support for the needles when fed into the gripper and means, independent of the needle for moving said support into and out of its operative position.

12. In a gramophone the combination of an arm having a reproducer, a stylus bar, and a quick release needle gripper, the arm carrying the reproducer being mounted for movement to the side of the turntable, automatic means for releasing the needle gripper, a needle magazine, a plunger associated with said magazine for feeding the needles one by one into the gripper, a stirrup mounted for sliding movement and engaging said plunger, a cam associated with said stirrup, a movable support for the needles when fed into the gripper, said support being operated by said cam and means for operating said stirrup.

13. In a gramophone the combination of an arm having a reproducer, a stylus bar and a quick release needle gripper, the arm carrying the reproducer being mounted for movement to the side of the turntable, a second arm mounted in the path of movement of said reproducer arm, a needle magazine, said second arm being adapted to support said magazine and said reproducer arm being adapted, to engage said second arm so that both arms move together, said movement being utilized for feeding a needle from said magazine.

14. In a gramophone the combination of an arm having a reproducer, a stylus bar and a quick release needle gripper, the arm carrying the reproducer being mounted for movement to the side of the turntable, a second arm mounted in the path of movement of said reproducer arm, a needle magazine, said second arm being adapted to support said magazine and said reproducer arm being adapted, to engage said second arm so that both arms move together, a plunger associated with said magazine, a cam fixed to a stationary part of the machine, said plunger being operated by the cam during said movement of said arms whereby a needle is fed from the magazine into the needle gripper.

15. In a gramophone the combination of an arm having a reproducer, a stylus bar and a quick release needle gripper the arm carrying the reproducer being mounted for movement to the side of the turntable, a second arm mounted in the path of movement of said reproducer arm, a needle magazine, said second arm being adapted to support said magazine and said reproducer arm being adapted, to engage said second arm so that both arms move together, the movement of said arms being utilized for feeding a needle from said magazine, and spring means for returning said second arm to its normal position after the return movement of said reproducer arm.

16. In a gramophone the combination of an arm having a reproducer, a stylus bar and a quick release needle gripper, the arm carrying the reproducer being mounted for movement to the side of the turntable, a second arm mounted in the path of movement of said reproducer arm, a needle magazine, said second arm being adapted to support said magazine, and said reproducer arm being adapted, to engage said second arm so that both arms move together, and means for operating the needle gripper, said means being actuated by the movement of said second arm.

17. In a gramophone the combination of an arm having a reproducer, a stylus bar and a quick release needle gripper, the arm carrying the reproducer being mounted for movement to the side of the turntable, a second arm mounted in the path of movement of said reproducer arm, a needle magazine, said second arm being adapted to support said magazine and said reproducer arm being adapted, to engage said second arm so that both arms move together, a movable support for the needles when fed into the gripper and means whereby said movable support is actuated by the movement of said second arm.

In witness whereof I affix my signature.

GEORGE BASIL KING.